United States Patent
Kim et al.

(10) Patent No.: US 11,002,619 B2
(45) Date of Patent: May 11, 2021

(54) PRESSURE-STRAIN SENSOR INCLUDING A GRAPHENE STRUCTURE

(71) Applicant: Electronics and Telecommunications Research Institute, Daejeon (KR)

(72) Inventors: Seong Jun Kim, Daejeon (KR); Choon-Gi Choi, Daejeon (KR); Shuvra Mondal, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 63 days.

(21) Appl. No.: 16/389,473

(22) Filed: Apr. 19, 2019

(65) Prior Publication Data

US 2019/0323905 A1 Oct. 24, 2019

(30) Foreign Application Priority Data

Apr. 20, 2018 (KR) .................. 10-2018-0046360
Oct. 10, 2018 (KR) .................. 10-2018-0120771

(51) Int. Cl.
*G01L 1/22* (2006.01)
*G01L 9/00* (2006.01)

(52) U.S. Cl.
CPC .......... *G01L 1/2287* (2013.01); *G01L 9/0051* (2013.01)

(58) Field of Classification Search
CPC ... C01B 2204/22; C01B 32/182; C01B 17/20; H01L 33/022408; H01L 33/032; H01L 33/113; H01L 29/1606; H01L 29/45; H01L 29/66969; H01L 29/78642; H01L 29/78681; H01L 29/78696; H01L 29/413; H01L 29/41733; H01L 29/41775; H01L 29/66742; H01L 29/78684; H01L 29/7869; H01L 29/78693
See application file for complete search history.

(56) References Cited

U.S. PATENT DOCUMENTS

| | | | |
|---|---|---|---|
| 9,059,397 B2 | 6/2015 | Park | |
| 2017/0241853 A1 | 8/2017 | Je et al. | |
| 2018/0151763 A1 | 5/2018 | Heo et al. | |
| 2018/0300006 A1* | 10/2018 | Lim | ............... G06F 3/0446 |

FOREIGN PATENT DOCUMENTS

KR 10-2018-0062236 A 6/2018

OTHER PUBLICATIONS

Seong Jun Kim, et al., "Highly sensitive and flexible strain-pressure sensor with cracked paddy shaped MoS2/graphene foam/Ecoflex hybrid nanostructures," ACS Applied Materials & Interfaces, Sep. 27, 2018.

Yu Pang, et al., "Flexible, Highly Sensitive, and Wearable Pressure and Strain Sensors with Graphene Porous Network Structure", ACS Applied Materials & Interfaces, vol. 8, pp. 26458-26462, Sep. 29, 2016.

Yuyang Qin, et al., "Lightweight, Superelastic, and Mechanically Flexible Graphene/ Polyimide Nanocomposite Foam for Strain Sensor Application", ACS NANO, vol. 9, No. 9, pp. 8933-8941, Aug. 24, 2015.

* cited by examiner

*Primary Examiner* — Joseph M Galvin, III
(74) *Attorney, Agent, or Firm* — Rabin & Berdo, P.C.

(57) ABSTRACT

Provided is a pressure-strain sensor including a graphene structure having a three-dimensional porous structure, planar sheets provided on a surface of the graphene structure, and a polymer layer configured to cover the graphene structure and the planar sheets, wherein each of the planar sheets contains a transition metal chalcogenide compound.

9 Claims, 23 Drawing Sheets

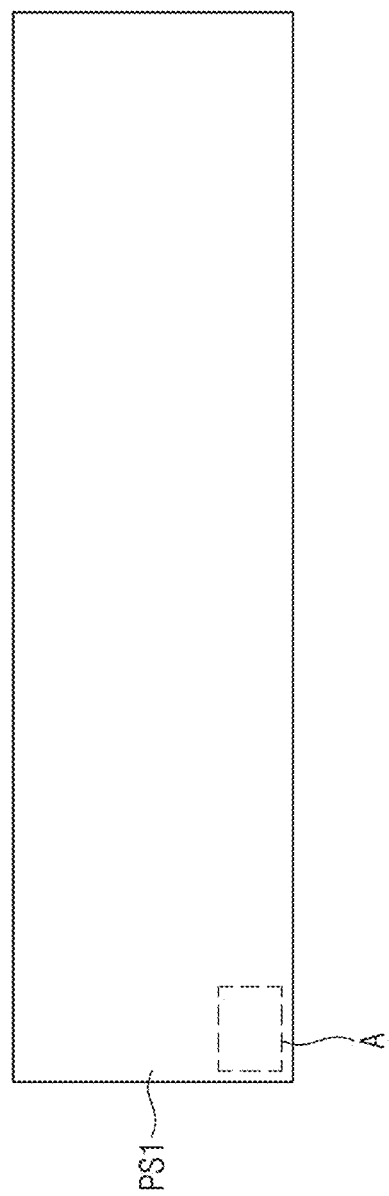

PRESSURE-STRAIN SENSOR INCLUDING A GRAPHENE STRUCTURE

CROSS-REFERENCE TO RELATED APPLICATIONS

This U.S. non-provisional patent application claims priority under 35 U.S.C. § 119 of Korean Patent Application Nos. 10-2018-0046360, filed on Apr. 20, 2018, and 10-2018-0120771, filed on Oct. 10, 2018, the entire contents of which are hereby incorporated by reference.

BACKGROUND

The present disclosure herein relates to a pressure-strain sensor and a manufacturing method thereof, and more particularly, to a pressure-strain sensor including planar sheets and a manufacturing method thereof.

When a specific object externally receives a vertical direction pressure, a tensile force, or a compressive force, a strain in length occurs. A pressure-strain sensor of a piezo resistive type is a sensor configured to sense a resistance change occurring according to a strain in length of the object and measure the pressure, the tensile force, or the compressive force of the object. When the length of the object is elongated and the cross-sectional area is reduced, the resistance of the object increases, and when the length of the object is reduced and the cross-sectional area is extended, the resistance of the object is reduced. A pressure-strain sensor using the above-described piezo resistive effect is referred to as a piezo resistive sensor.

SUMMARY

The present disclosure provides a pressure-strain sensor of which sensitivity and durability are excellent, and a manufacturing method thereof.

An embodiment of the inventive concept provides a pressure-strain sensor including: a graphene structure having a three-dimensional porous structure; planar sheets provided on a surface of the graphene structure; and a polymer layer configured to cover the graphene structure and the planar sheets, wherein each of the planar sheets contains a transition metal chalcogenide compound.

In an embodiment, each of the planar sheets may contain at least one selected from the group consisting of $MoS_2$, $WS_2$, $TiS_2$, $TaS_2$, $NiS_2$, $PtS_2$, $PdS_2$, $ReS_2$, $ZrS_2$, $HfS_2$, $NbS_2$, $CoS_2$, $MoSe_2$, $WSe_2$, $TiSe_2$, $TaSe_2$, $NiSe_2$, $PtSe_2$, $PdSe_2$, $ReSe_2$, $ZrSe_2$, $HfSe_2$, $NbSe_2$, $CoSe_2$, $MoTe_2$, $WTe_2$, $TiTe_2$, $TaTe_2$, $NiTe_2$, $PtTe_2$, $PdTe_2$, $ReTe_2$, $ZrTe_2$, $HfTe_2$, $NbTe_2$, $CoTe_2$, and a combination thereof.

In an embodiment, an inside of the graphene structure may be an empty space.

In an embodiment, the pressure-strain sensor may further include a protection layer configured to surround the graphene structure, the planar sheets, and the polymer layer.

In an embodiment, the pressure-strain sensor may further include a wire configured to penetrate through the protection layer to be connected to the planar sheets.

In an embodiment, the planar sheets may be separated from each other.

In an embodiment, the planar sheets may cover a part of the surface of the graphene structure, and expose another part of the graphene structure.

In an embodiment, the polymer layer and the protection layer may contain an identical material.

In an embodiment, each of the polymer layer and the protection layer may contain one among Polydimethylsiloxane (PDMS), ECOFLEX (a product of BASF), hydrogel, or a flexible polymer.

In an embodiment of the inventive concept, a manufacturing method of a pressure-strain sensor includes: providing a graphene structure on a three-dimensional porous metal foam to provide a first pre-structure; providing planar sheets on the graphene structure to provide a second pre-structure; providing a polymer layer configured to cover the graphene structure and the planar sheets to provide a third pre-structure; and removing the metal foam.

In an embodiment, the providing of the planar sheets may include immersing the first pre-structure in a transition metal chalcogenide compound solution.

In an embodiment, a ratio of the transition metal chalcogenide compound in the transition metal chalcogenide compound solution may be about 0.1 wt % to about 5 wt %.

In an embodiment, the transition metal chalcogenide compound may be at least one selected from the group consisting of $MoS_2$, $WS_2$, $TiS_2$, $TaS_2$, $NiS_2$, $PtS_2$, $PdS_2$, $ReS_2$, $ZrS_2$, $HfS_2$, $NbS_2$, $CoS_2$, $MoSe_2$, $WSe_2$, $TiSe_2$, $TaSe_2$, $NiSe_2$, $PtSe_2$, $PdSe_2$, $ReSe_2$, $ZrSe_2$, $HfSe_2$, $NbSe_2$, $CoSe_2$, $MoTe_2$, $WTe_2$, $TiTe_2$, $TaTe_2$, $NiTe_2$, $PtTe_2$, $PdTe_2$, $ReTe_2$, $ZrTe_2$, $HfTe_2$, $NbTe_2$, $CoTe_2$, and a combination thereof.

In an embodiment, the providing of the planar sheets may further include: drying the first pre-structure at a temperature of about 80° C. to about 100° C.; and thermally treating the first pre-structure at a temperature of about 600° C. to about 1000° C.

In an embodiment, the thermally treating may include: disposing the first pre-structure in a chamber; and flowing argon in the chamber.

In an embodiment, the immersing of the pre-structure may include immersing the first pre-structure in a transition metal chalcogenide compound solution for about 1 minute to about 60 minutes.

In an embodiment, the providing of the third pre-structure may include providing a protection layer configured to surround the third pre-structure.

In an embodiment, the providing of the polymer layer may include: immersing the second pre-structure in a liquid phase polymer; and drying the liquid phase polymer adhered to the second pre-structure.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIGS. 2A, 3A, and 4A are views for describing a manufacturing method of a pressure-strain sensor according to embodiment of the inventive concept;

DETAILED DESCRIPTION

Advantages and features of the present invention, and methods for achieving the same will be cleared with reference to exemplary embodiments described later in detail together with the accompanying drawings. However, the present invention is not limited to the following exemplary embodiments, but realized in various forms. In other words, the present exemplary embodiments are provided just to complete disclosure the present invention and make a person having an ordinary skill in the art understand the scope of the invention. The present invention should be defined by only the scope of the accompanying claims. Throughout this specification, like numerals refer to like elements.

The terminology used herein is for the purpose of describing particular embodiments only and is not intended to limit the scope of the present disclosure. As used herein, the singular forms "a", "an" and "the" are intended to include the plural forms as well, unless the context clearly indicates otherwise. It will be further understood that the terms "comprises" and/or "comprising" used herein specify the presence of stated components, operations and/or elements but do not preclude the presence or addition of one or more other components, operations and/or elements.

Hereinafter, a detailed description about embodiments of the inventive concept will be provided.

Figure 1A:
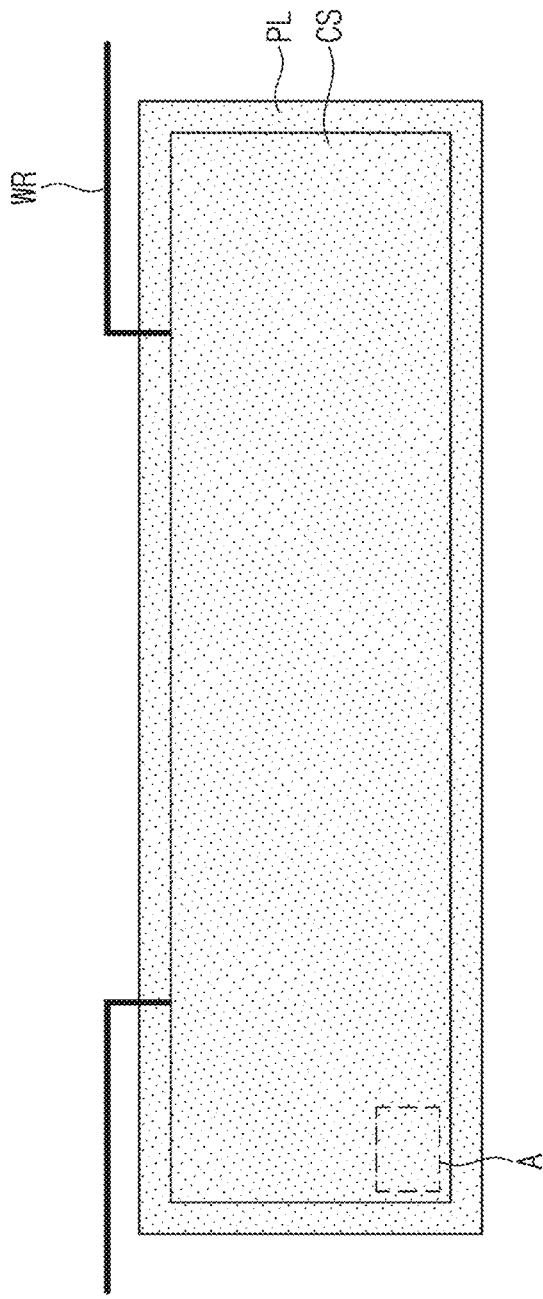
FIG. 1A is a view for explaining a pressure-strain sensor according to an embodiment of the inventive concept.
Figure 1B:
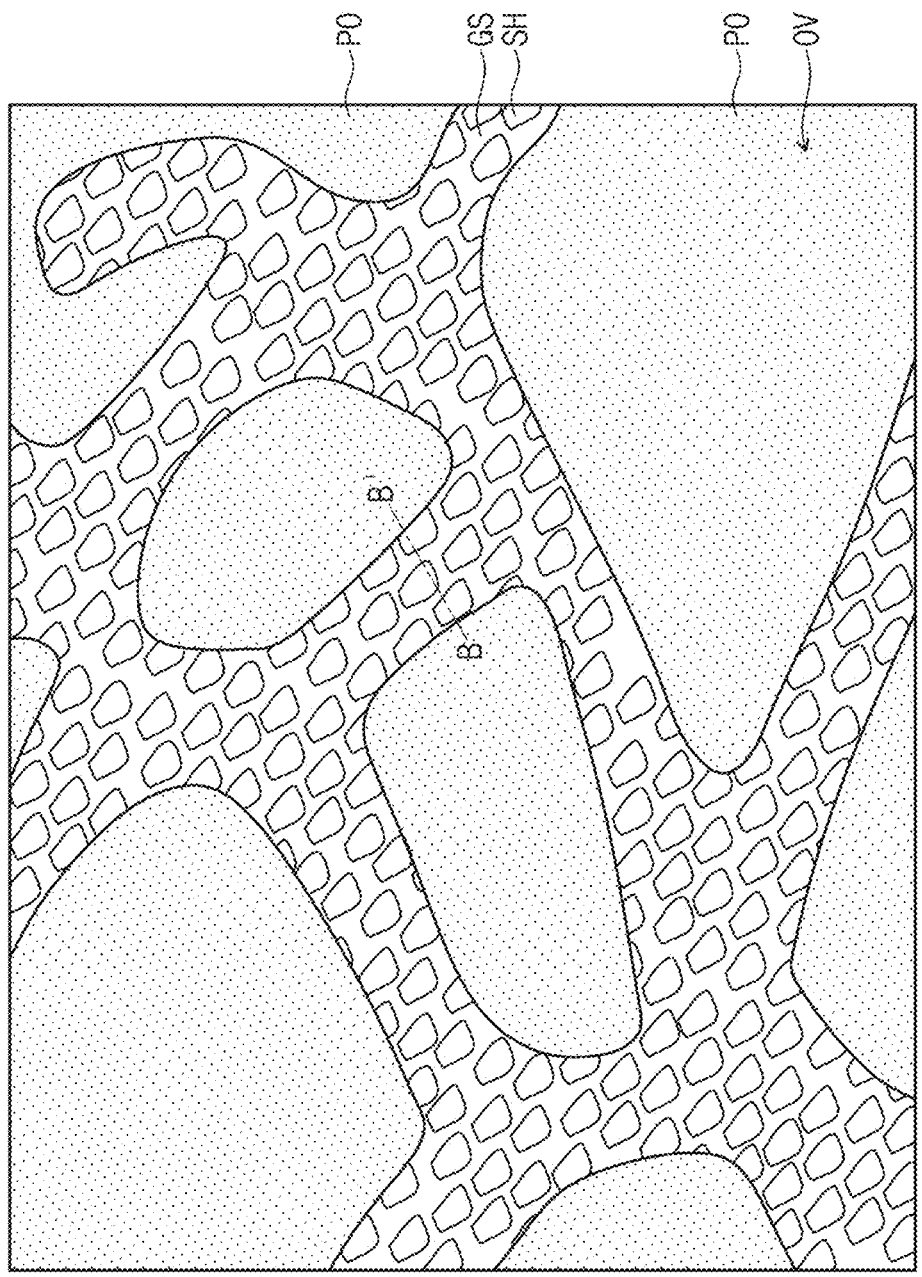
FIG. 1B is an enlarged view of region A of FIG. 1A.
Figure 1C:
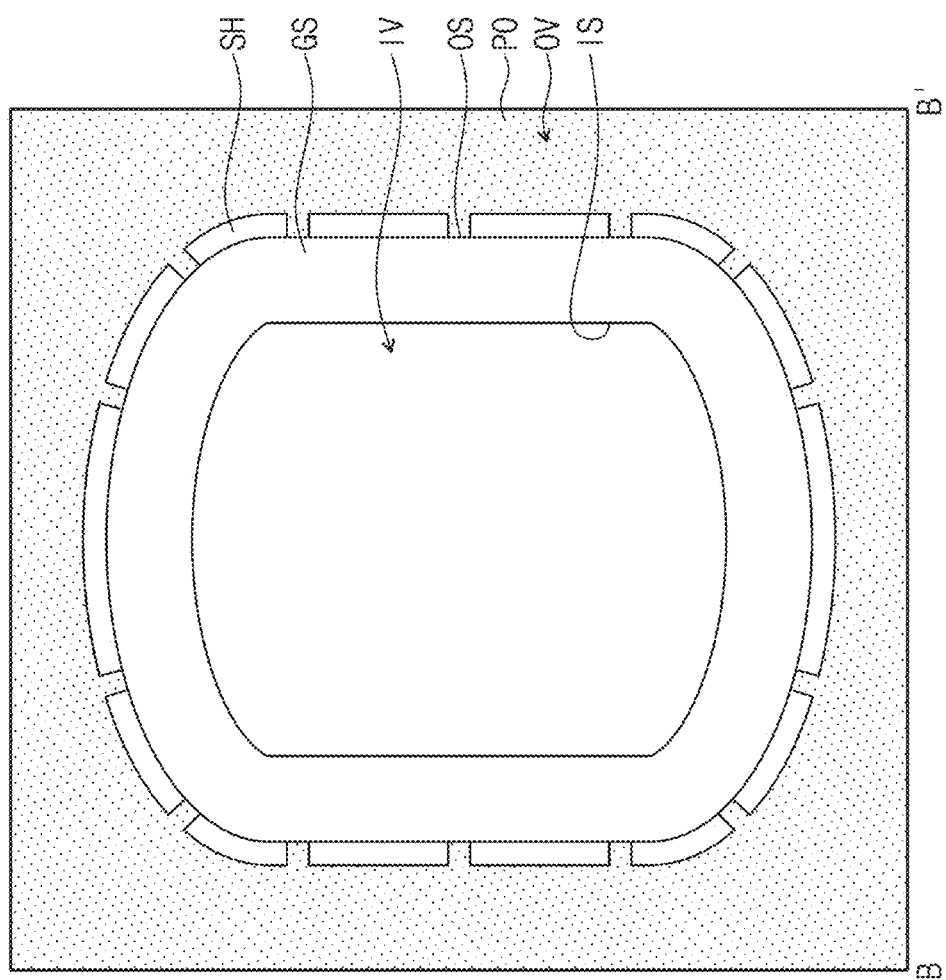
FIG. 1C is a cross-sectional view along line B-B' of FIG. 1B.

FIG. 1A is a view for explaining a pressure-strain sensor according to an embodiment of the inventive concept. FIG. 1B is an enlarged view of region A of FIG. 1A. FIG. 1C is a cross-sectional view along line B-B' of FIG. 1B.

In relation to FIGS. 1A to 1C, the pressure-strain sensor according to an embodiment of the inventive concept may include a composite structure CS, a protection layer PL, and wires WR.

The composite structure CS may include a graphene structure (GS), planar sheets SH, and a polymer layer PO. The graphene structure GS may have a three-dimensional porous structure. In other words, the graphene structure GS may have a three-dimensional branch type that is irregularly extended.

In addition, an outer void OV and an inner void IV may be defined by the graphene structure GS. The inner void IV may be defined by the inner surface IS of the graphene structure GS. In other words, the inner void IV may be a space surrounded by the inner surface IS of the graphene structure GS. In short, the inner void IV may be provided inside the graphene structure GS. The inner void IV may be a substantially empty space. In other words, the inner side of the graphene structure GS may be an empty space. The inner void IV may have a three-dimensional structure similar to the graphene structure GS. The graphene structure GS may have the shape conformally surrounding the inner void IV.

The outer void OV may be defined by the outer surface OS of the graphene structure GS.

The planar sheets may be provided on the outer surface OS of the graphene structure GS. The planar sheets SH may cover a part of the outer surface OS of the graphene structure GS, and expose another part thereof. The planar sheets SH may be separated from each other on the outer surface OS of the graphene structure GS. The planar sheets may be conformally provided. In other words, the thicknesses of the planar sheets SH may be constant.

Each of the planar sheets SH may contain a transition metal chalcogenide compound. For example, each of the planar sheets SH may contain at least one selected from the group consisting of $MoS_2$, $WS_2$, $TiS_2$, $TaS_2$, $NiS_2$, $PtS_2$, $PdS_2$, $ReS_2$, $ZrS_2$, $HfS_2$, $NbS_2$, $CoS_2$, $MoSe_2$, $WSe_2$, $TiSe_2$, $TaSe_2$, $NiSe_2$, $PtSe_2$, $PdSe_2$, $ReSe_2$, $ZrSe_2$, $HfSe_2$, $NbSe_2$, $CoSe_2$, $MoTe_2$, $WTe_2$, $TiTe_2$, $TaTe_2$, $NiTe_2$, $PtTe_2$, $PdTe_2$, $ReTe_2$, $ZrTe_2$, $HfTe_2$, $NbTe_2$, $CoTe_2$, and a combination thereof.

Each of the planar sheets SH may have a single molecular layer structure, or a layered structure in which 2 to 10 molecular layers are laminated. In other words, each of the planar sheets SH may have a two-dimensional structure. For example, each of the planar sheets SH may have a single molecular layer structure of the transition metal chalcogenide compound. For another example, each of the planar sheets SH may have a layered structure with a first molecular layer and a second molecular layer laminated on the first molecular layer. In this case, the first molecular layer and the second molecular layer on the planar sheets SH may be bound by a van der Waals force.

The planar sheets may contain an identical material. In other words, the planar sheets SH may have an identical composition to each other. The planar sheets SH may have an identical crystal structure to each other or different crystal structures. For example, the crystal structure may include a hexagonal lattice structure, a triangular prism lattice structure, an orthorhombic lattice structure, and an octagonal strain (monoclinic) lattice structure.

The polymer layer PO configured to completely fill the outer void OV may be provided. The polymer layer PO may cover the planar sheets SH and the graphene structure GS. The graphene structure GS may be supported and the shape thereof may be maintained by the polymer layer PO. The polymer layer PO may contain a polymer that is harmless to a human body. For example, the polymer layer PO may include one among Polydimethylsiloxane (PDMS), ECO-FLEX, hydrogel, or a flexible polymer.

The resistance of the composite structure CS may be changed according to compression, stretching, or bending. The composite structure CS may contain the graphene structure GS and the polymer layer PO to have the relatively excellent restoring force and durability. In addition, the composite structure CS may include the planar sheets SH containing the transition metal chalcogenide compound, and thus the sensitivity of a change in resistance according to the compression, stretching or bending may be relatively excellent.

A protection layer PL may be provided which surrounds the composite structure CS. The protection layer PL may block the composite structure CS from the outside to protect the composite structure CS. The protection layer PL may contain the same material as the polymer layer PO. For example, the protection layer PL may contain one among Polydimethylsiloxane (PDMS), ECOFLEX, hydrogel, or a flexible polymer.

The wires WR may penetrate through the protection layer PL to be connected to the composite structure CS. The wires WR may be respectively connected to the planar sheets SH of the composite structure CS. The composite structure CS may be electrically connected to an external circuit through the wires WR, and the resistance of the composite structure CS may be measured.

Figure 2A:
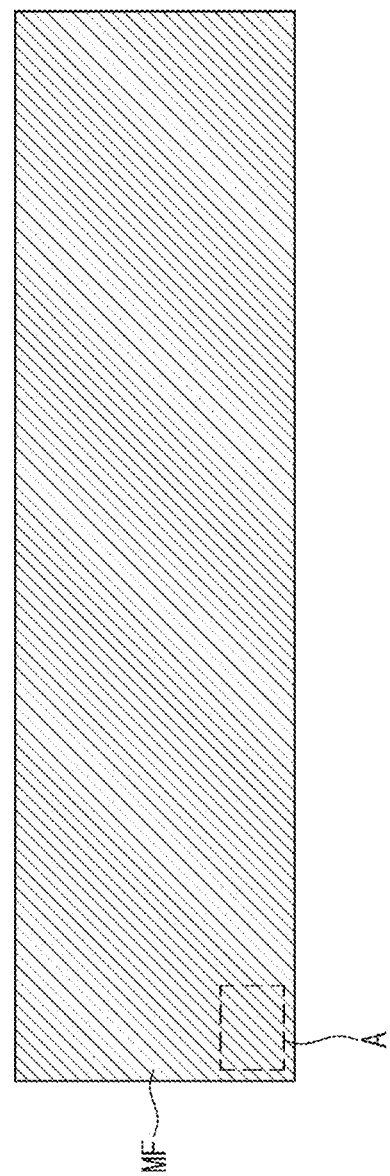
Figure 2B:
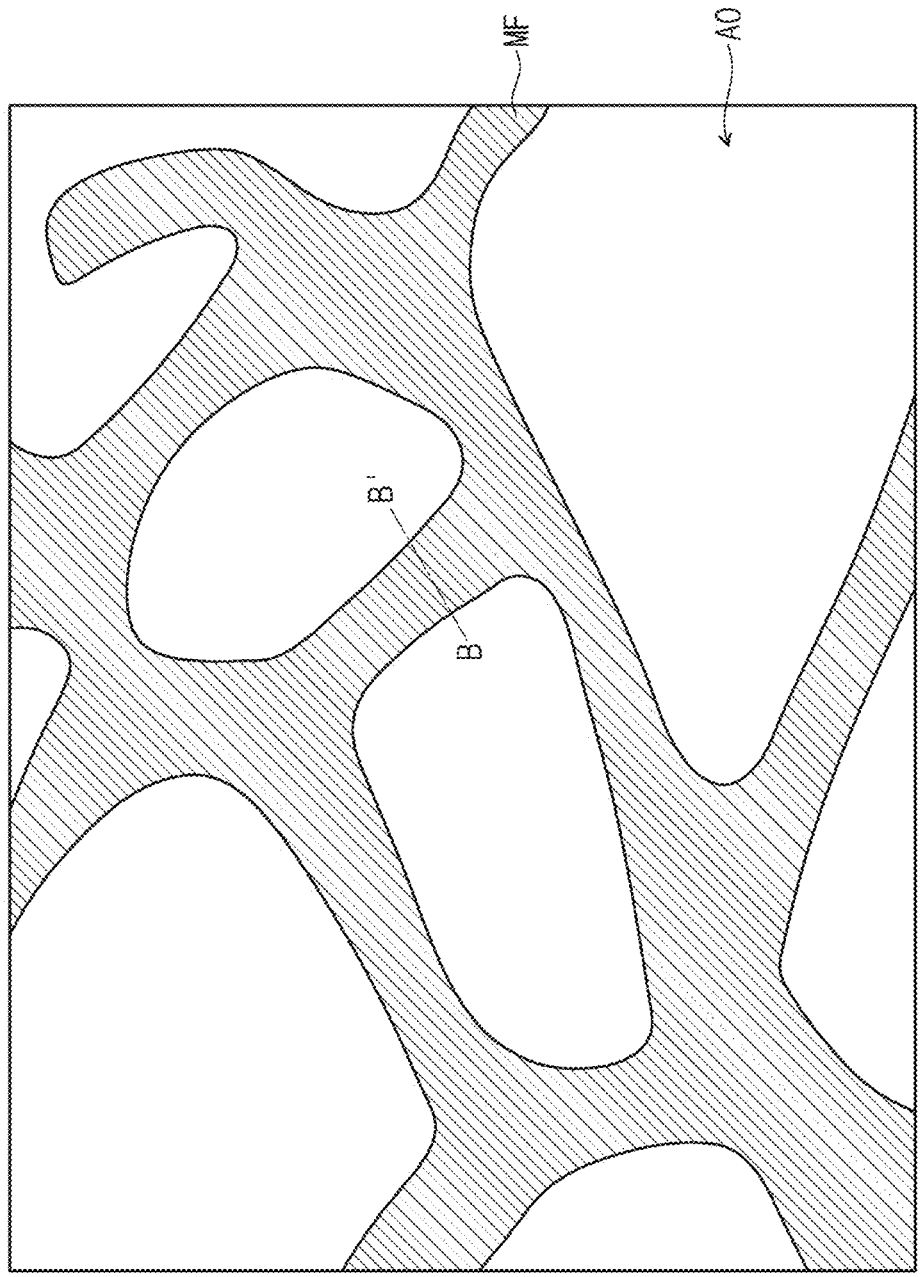
FIGS. 2B, 3B, and 4B are respective enlarged views of region A of FIGS. 2A, 3A and 4A.
Figure 2C:
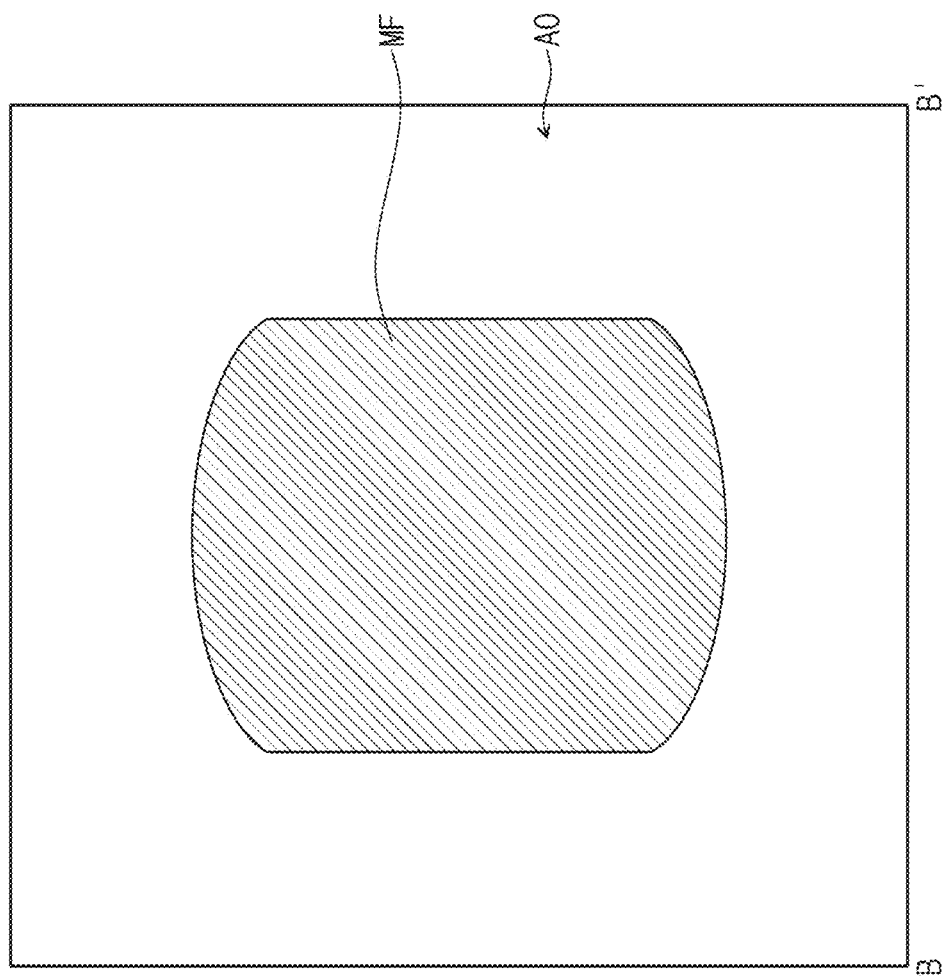
FIGS. 2C, 3C, and 4C are respective cross-sectional views along line B-B' of FIGS. 2B, 3B, and 4B.
Figure 3B:
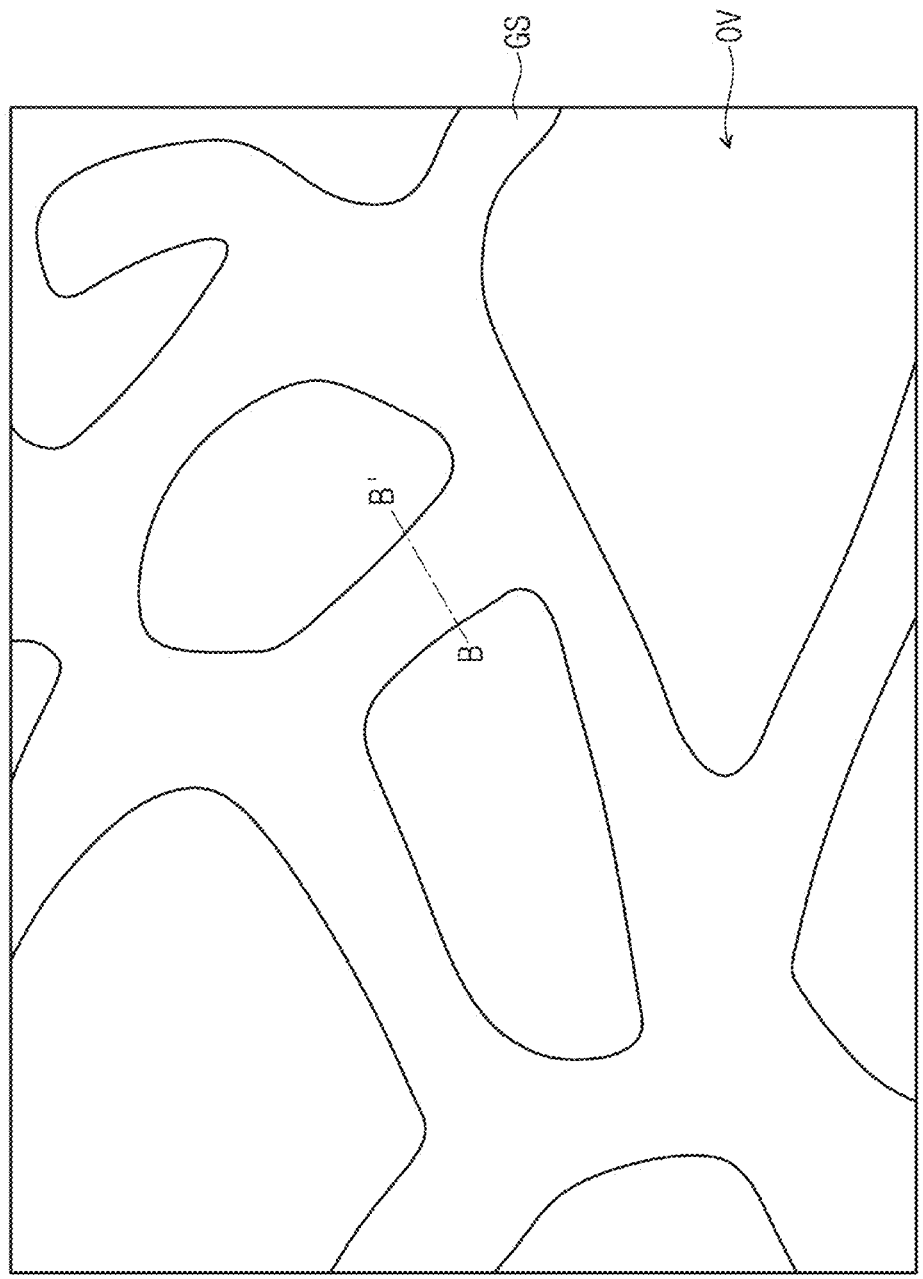
Figure 3C:
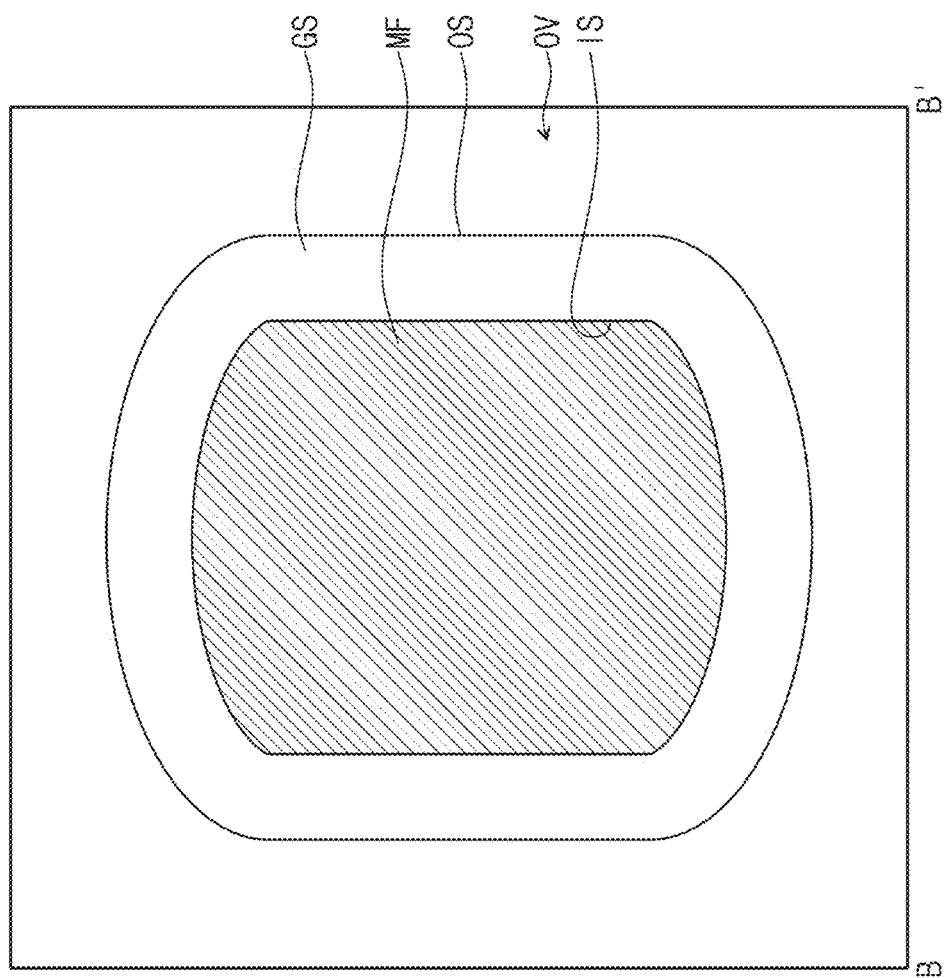
Figure 4A:
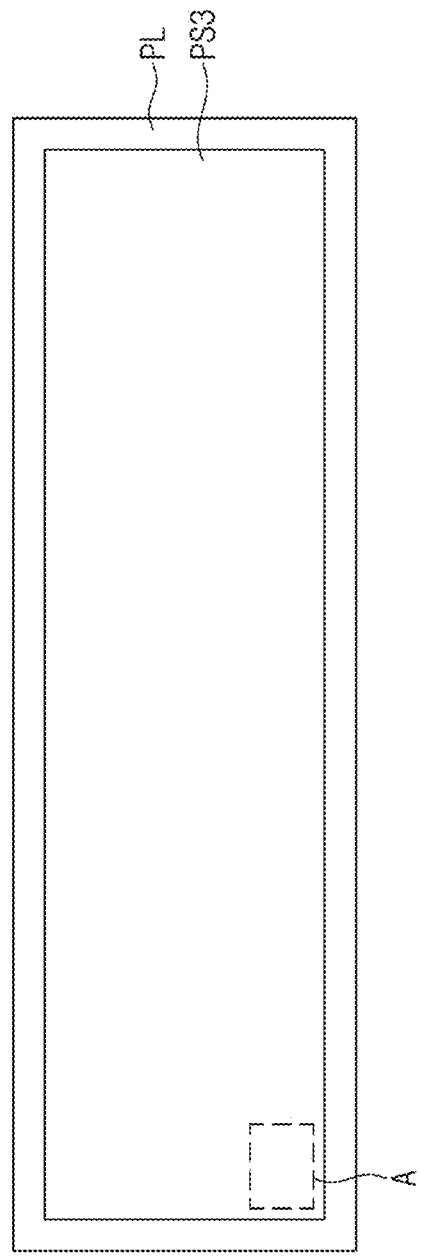
Figure 4B:
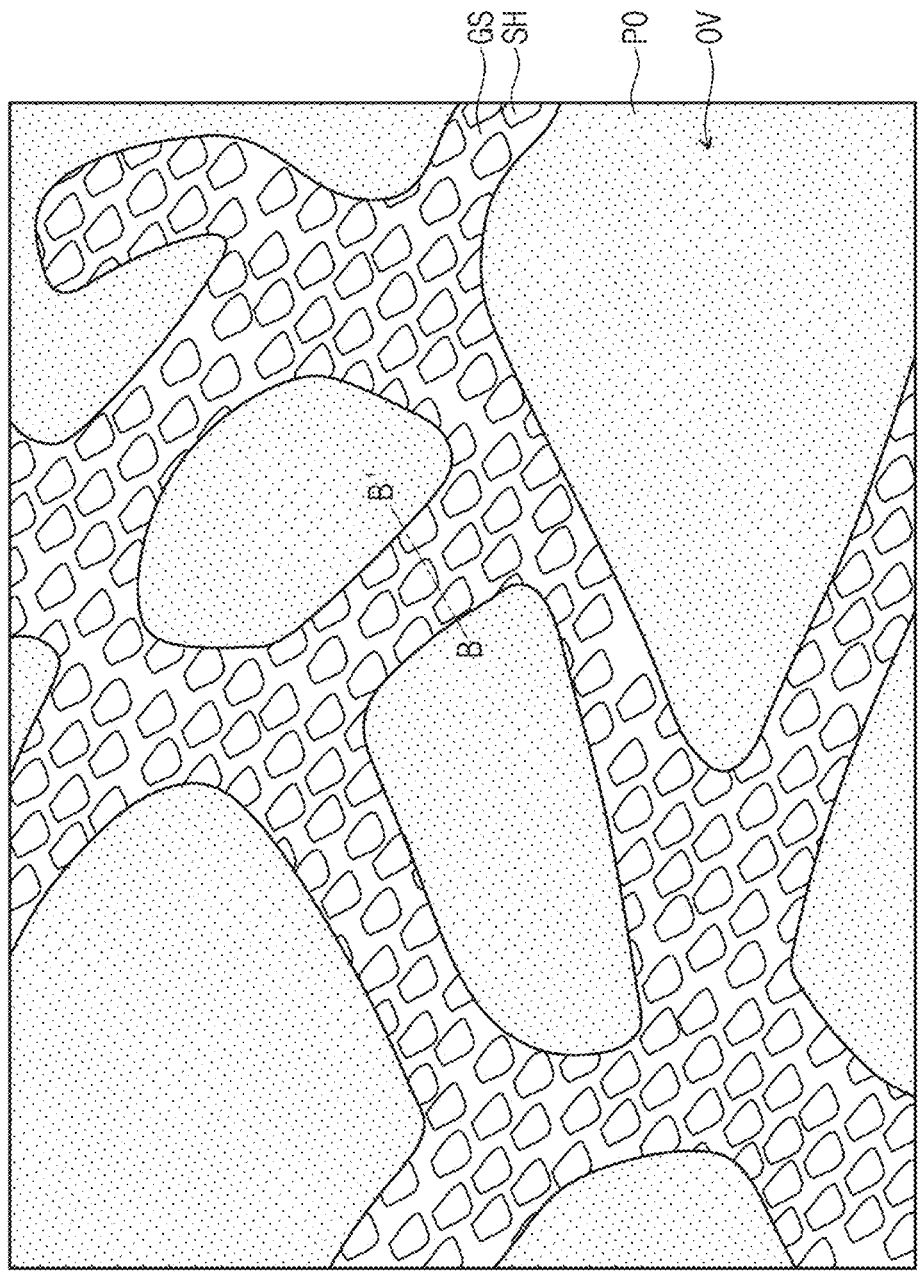
Figure 4C:
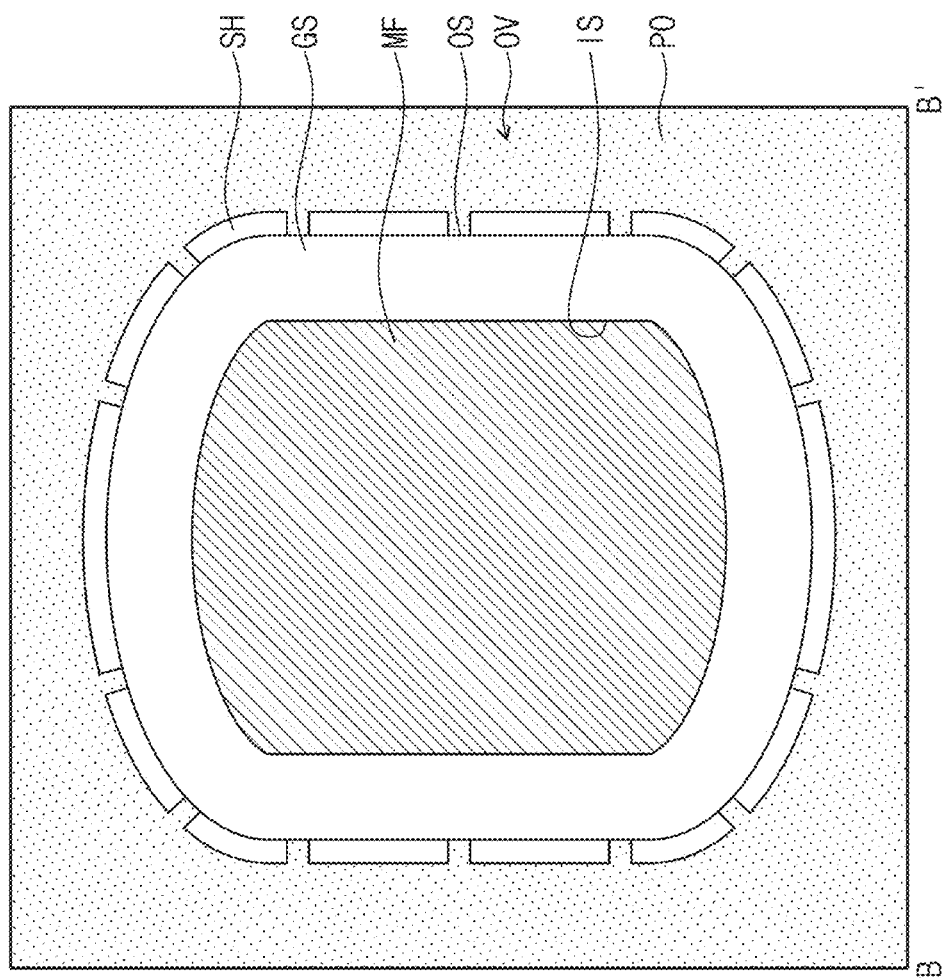

FIGS. 2A, 3A, and 4A are views for describing a manufacturing method of a pressure-strain sensor according to embodiment of the inventive concept. FIGS. 2B, 3B, and 4B are respective enlarged views of region A of FIGS. 2A, 3A and 4A. FIGS. 2C, 3C, and 4C are respective cross-sectional views along line B-B' of FIGS. 2B, 3B, and 4B.

In relation to FIGS. 2A to 2C, a metal foam MF may be provided. For example, the metal foam MF may be a nickel foam. The metal foam MF may have a three-dimensional porous structure. In other words, the metal foam MF may have a three-dimensional branch type that is irregularly extended. The metal foam MF may define a pore AO. A volume ratio of the metal foam MF to the pore AO may be about 2:98 to about 25:75. In other words, the metal foam MF may have a pore ratio of about 75% to about 98%.

In relation to FIGS. 3A to 3C, the graphene structure GS is provided on the metal foam MF to provide a first pre-structure PS1. The first pre-structure PS1 may include the metal foam MF and the graphene structure GS. The graphene structure GS may be conformally provided on the metal foam MF via a Thermal Chemical Vapor Deposition (TCVD) process. In other words, the metal foam MF may be surrounded by the inner surface IS of the graphene structure GS. The graphene structure GS may partially fill the pore AO. The pore AO partially filled with the graphene structure GS may be defined as the outer void OV. The outer void OV may be defined by the outer surface OS of the graphene structure GS.

In relation to FIGS. 4A and 4B, the planar sheets SH are provided on the outer surface OS of the graphene structure GS to provide a second pre-structure. The second pre-structure may include the metal foam MF, the graphene structure GS and the planar sheets SH. Providing the planar sheets SH may include manufacturing a transition metal chalcogenide compound solution, immersing the first pre-structure PS1 in the transition metal chalcogenide compound solution for about 1 minute to about 60 minutes, extracting the first pre-structure PS1 from the transition metal chalcogenide compound solution, drying the first pre-structure PS1 at a temperature of about 80° C. to about 100° C., and thermally treating the first pre-structure PS1 at a temperature of about 600° C. to about 1000° C. The transition metal chalcogenide compound solution may include the transition metal chalcogenide compound and a solvent. A ratio of the transition metal chalcogenide compound in the transition metal chalcogenide compound solution may about 0.1 wt % to about 5 wt %. For example, when the planar sheets SH are provided, nano flakes (not shown) may be provided on each of the planar sheets SH. As the ratio of the transition metal chalcogenide compound becomes larger, the sizes and densities of the nano flakes on each of the planar sheets SH may become large. For example, the transition metal chalcogenide compound may be at least one selected from the group consisting of $MoS_2$, $WS_2$, $TiS_2$, $TaS_2$, $NiS_2$, $PtS_2$, $PdS_2$, $ReS_2$, $ZrS_2$, $HfS_2$, $NbS_2$, $CoS_2$, $MoSe_2$, $WSe_2$, $TiSe_2$, $TaSe_2$, $NiSe_2$, $PtSe_2$, $PdSe_2$, $ReSe_2$, $ZrSe_2$, $HfSe_2$, $NbSe_2$, $CoSe_2$, $MoTe_2$, $WTe_2$, $TiTe_2$, $TaTe_2$, $NiTe_2$, $PtTe_2$, $PdTe_2$, $ReTe_2$, $ZrTe_2$, $HfTe_2$, $NbTe_2$, $CoTe_2$, and a combination thereof. For example, the solvent may be Ethylene glycol (EG) or Dimethylformamide (DMF). Thermally treating the first pre-structure PS1 at the temperature of about 600° C. to about 1000° C. may include providing the first pre-structure PS1 in a chamber, and flowing argon (Ar) in the chamber at about 500 sccm to 1000 sccm.

The polymer layer PO configured to cover the graphene structure GS and the planar sheets SH may be provided to provide a third pre-structure PS3. The third pre-structure PS3 may include the metal foam MF, the graphene structure GS, planar sheets SH, and the polymer layer PO. A protection layer PL configured to surround the third pre-structure PS3 may be provided. Providing the polymer layer PO and the protection layer PL may include preparing a liquid phase polymer, immersing the second pre-structure in the liquid phase polymer, extracting the second pre-structure in the liquid phase polymer, and drying the liquid phase polymer adhered to the second pre-structure. As a result of the immersing of the second pre-structure in the liquid phase polymer, the liquid phase polymer may permeate the outer void OV of the second pre-structure, and the liquid phase polymer surrounds the second pre-structure. The liquid phase polymer that has permeated the outer void OV is dried to provide the polymer layer PO that completely fills the outer void OV. The liquid polymer configured to surround the second pre-structure is dried to provide the protection layer PL. The liquid phase polymer may contain a polymer that is harmless to a human body. For example, the liquid phase polymer may include one among Polydimethylsiloxane (PDMS), ECOFLEX, hydrogel, or a flexible polymer.

Referring to FIGS. 1A and 1B again, the metal foam MF of the third pre-structure PS3 may be removed. Removing the metal foam MF may include providing an etchant, immersing the third pre-structure PS3 and the protection layer PL in the etchant, and extracting the third pre-structure PS3 and the protection layer PL from the etchant. The etchant may include a material for etching the metal foam MF. For example, when the metal foam MF includes nickel, the etchant may include a material for etching nickel. The etchant may permeate the protection layer PL, the polymer layer PO, and the graphene structure GS to reach the metal foam MF, and may etch the metal foam MF.

When the metal foam MF is removed, the inner void IV surrounded by the graphene structure GS may be defined. The inner void IV may be provided as a substantially empty space. When the metal foam MF is removed, the third pre-structure PS3 may be provided as a composite structure CS including the polymer layer PO, the graphene structure GS, and the planar sheets SH.

The wires WR may penetrate through the protection layer PL to be connected to the composite structure CS. The wires WR may be respectively connected to the planar sheets SH of the composite structure CS.

Figure 5A:
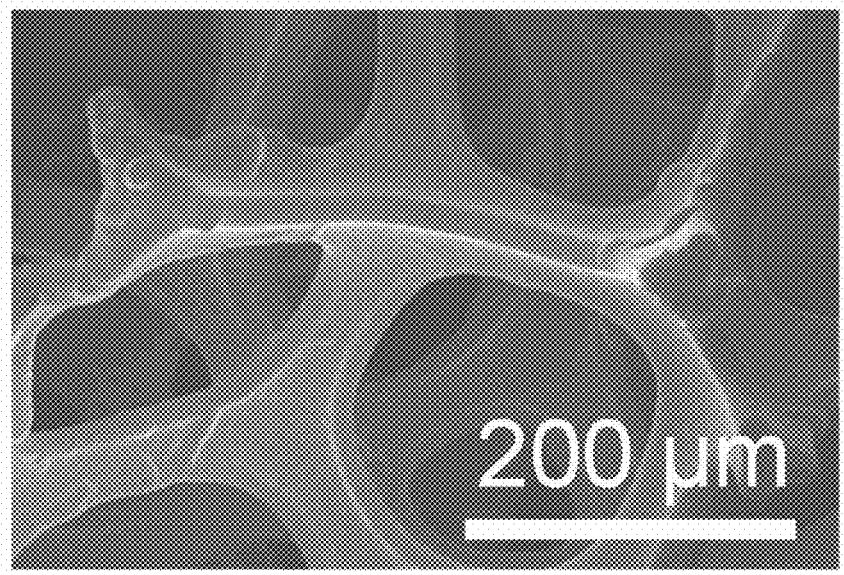
FIGS. 5A and 5B are Field Emission Scanning Electron Microscope (FESEM) images of a nickel foam.
Figure 5B:
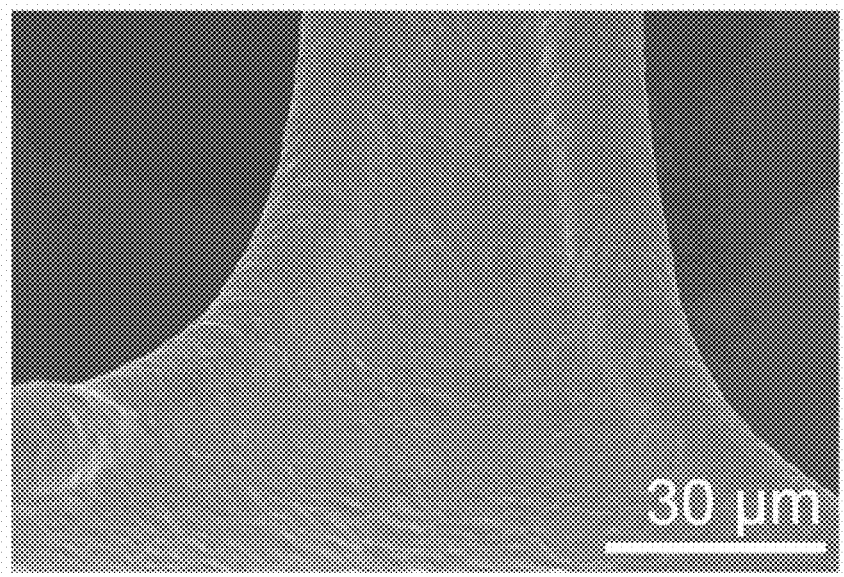

FIGS. 5A and 5B are Field Emission Scanning Electron Microscope (FESEM) images of a nickel foam;

In relation to FIGS. 5A and 5B, it may be checked that the nickel foam has the three-dimensional porous structure.

Figure 6A:
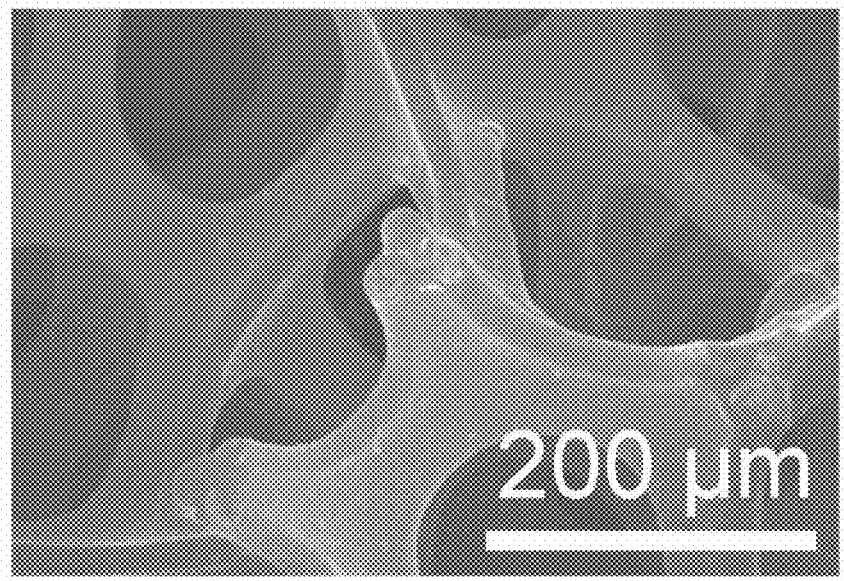
FIGS. 6A and 6B are FESEM images of a graphene structure provided on a nickel foam.
Figure 6B:
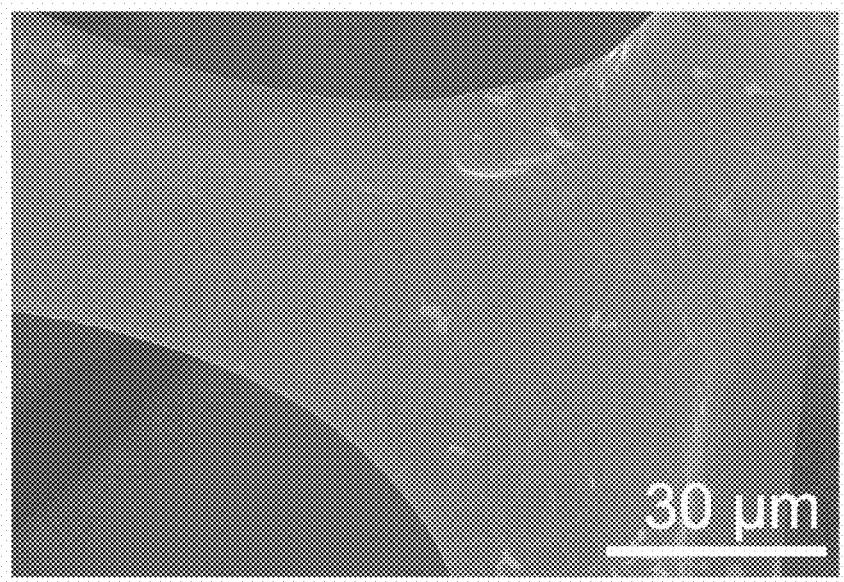

FIGS. 6A and 6B are FESEM images of the graphene structure provided on the nickel foam.

In relation to FIGS. 6A and 6B, it may be checked that the graphene structure is provided on the nickel foam.

Figure 7A:
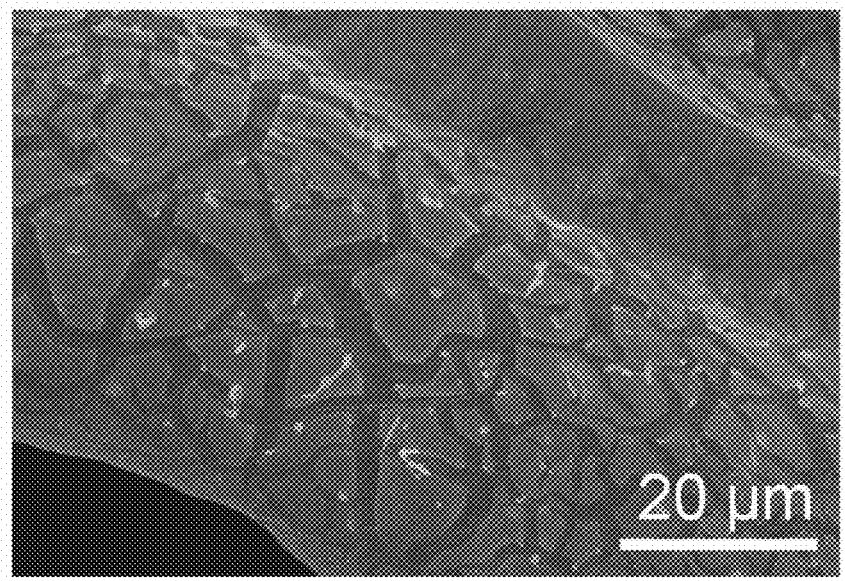
FIGS. 7A and 7B are FESEM images of planar sheets provided by a solution of about 0.2 wt % $(NH_4)_2MoS_4$.
Figure 7B:
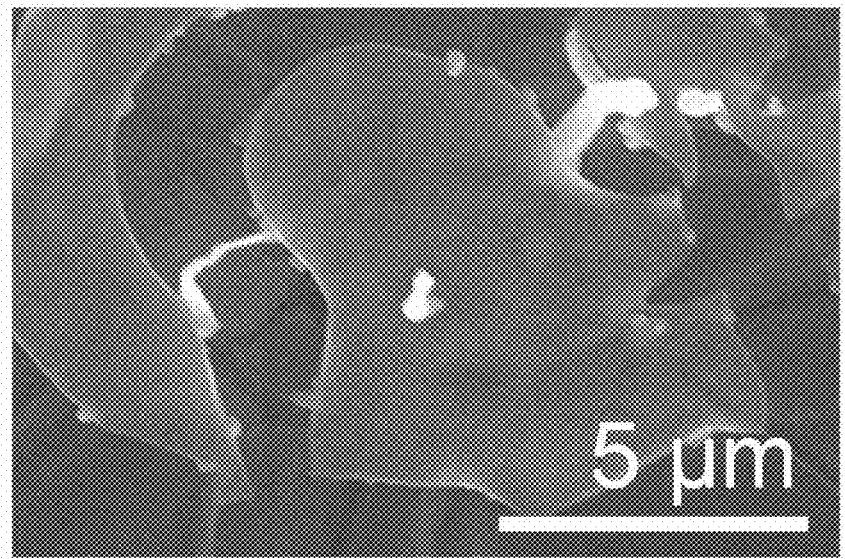
Figure 8A:
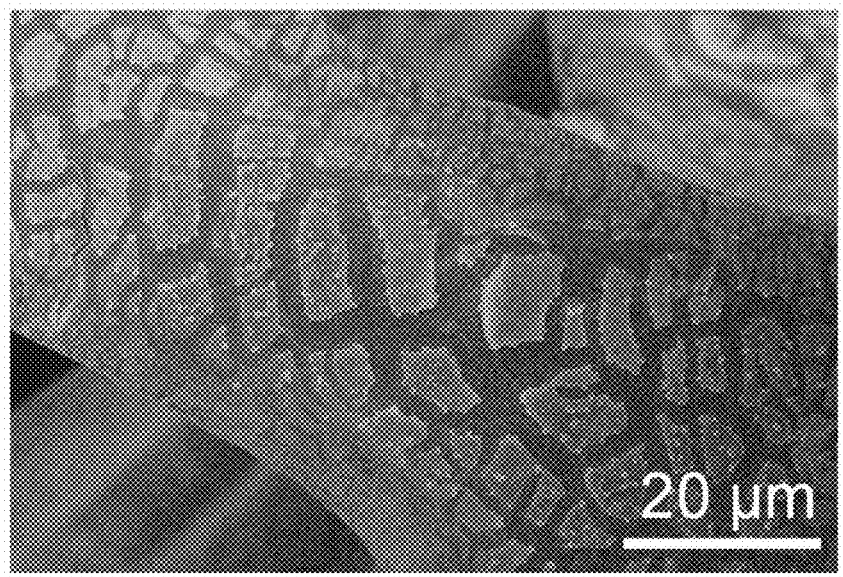
FIGS. 8A and 8B are FESEM images of planar sheets provided by a solution of about 0.5 wt % $(NH_4)_2MoS_4$.
Figure 8B:
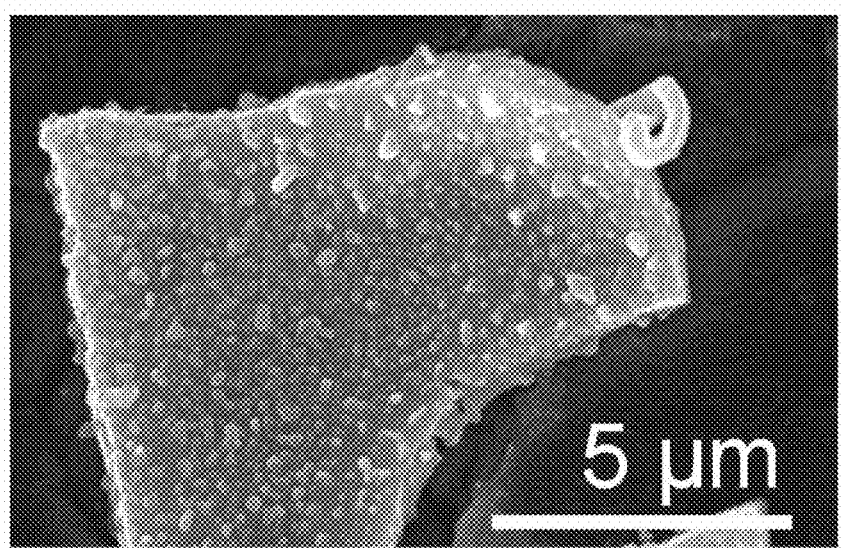

FIGS. 7A and 7B are FESEM images of planar sheets provided by a solution of about 0.2 wt % $(NH_4)_2MoS_4$. FIGS. 8A and 8B are FESEM images of planar sheets provided by a solution of about 0.5 wt % $(NH_4)_2MoS_4$.

Figure 9A:
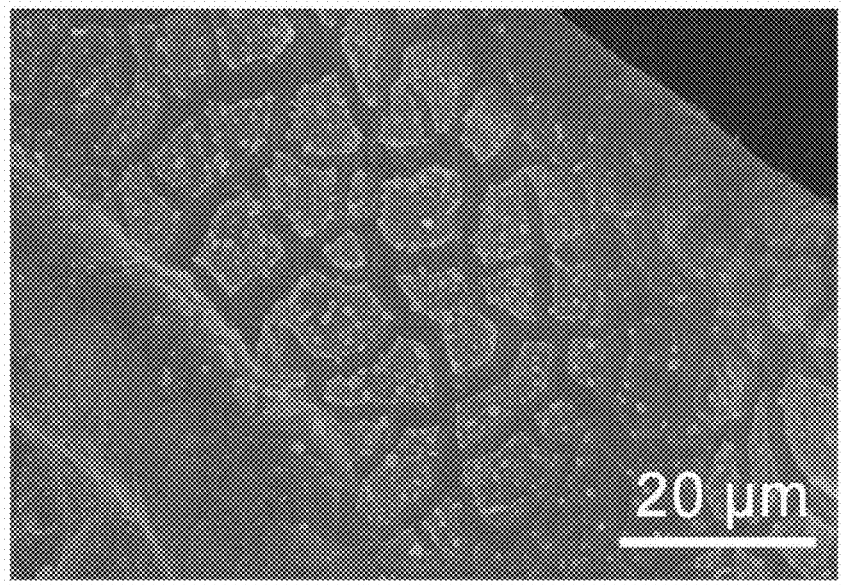
FIGS. 9A and 9B are FESEM images of planar sheets provided by a solution of about 1.25 wt % $(NH_4)_2MoS_4$.
Figure 9B:
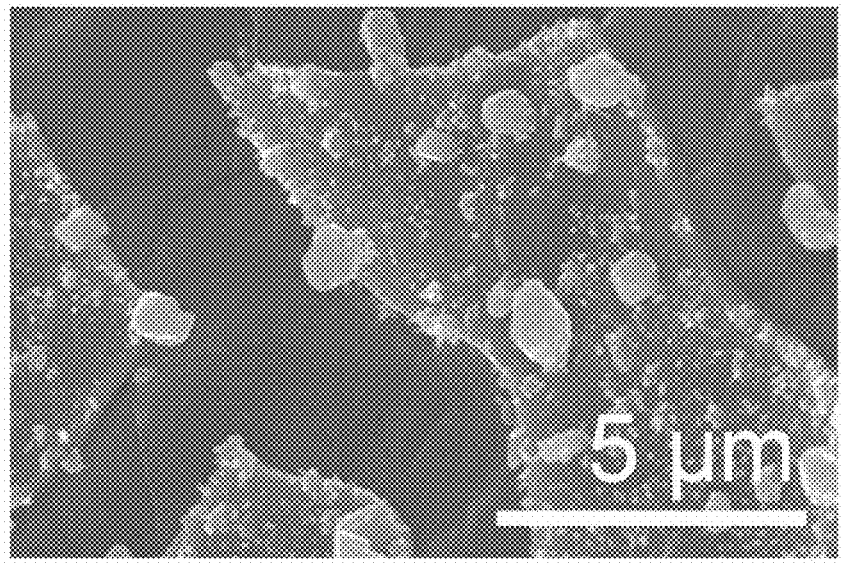

FIGS. 9A and 9B are FESEM images of planar sheets provided by a solution of about 1.25 wt % $(NH_4)_2MoS_4$.

In relation to FIGS. 7A and 7B, it may be checked that the first pre-structure containing a nickel foam and a graphene structure is immersed in the solution of about 0.2 wt % $(NH_4)_2MoS_4$ for about 30 minutes, and then dried and thermally treated at about 600° C. to provide the planar sheets. In FIGS. 7A and 7B, it may be checked that the nano flakes are provided on the planar sheets.

In relation to FIGS. 8A and 8B, it may be checked that the first pre-structure containing a nickel foam and a graphene structure is immersed in the solution of about 0.5 wt % $(NH_4)_2MoS_4$ for about 30 minutes, and then dried and thermally treated at about 600° C. to provide the planar sheets. In FIGS. 8A and 8B, it may be checked that the nano flakes are provided on the planar sheets.

In relation to FIGS. 9A and 9B, it may be checked that the first pre-structure containing a nickel foam and a graphene structure is immersed in a solution of about 1.25 wt % $(NH_4)_2MoS_4$ for about 30 minutes, and then dried and thermally treated at about 600° C. to provide the planar sheets. In FIGS. 9A and 9B, it may be checked that the nano flakes are provided on the planar sheets.

Referring to FIGS. 7A to 9B again, it may checked that according to wt % of the $(NH_4)_2MoS_4$ solution in which the first pre-structure is immersed, the densities, shapes and sizes of the nano-flakes become different.

Figure 10A:
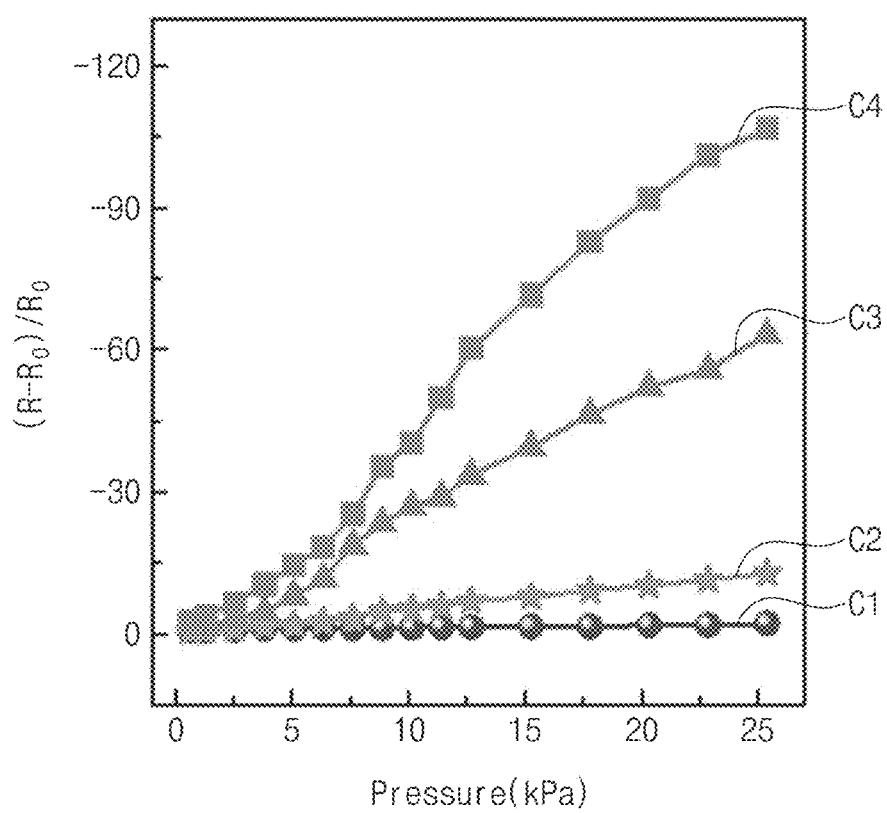
FIGS. 10A to 10D are views for describing a resistance according to a pressure applied to a pressure-strain sensor according to embodiments of the inventive concept.
Figure 10B:
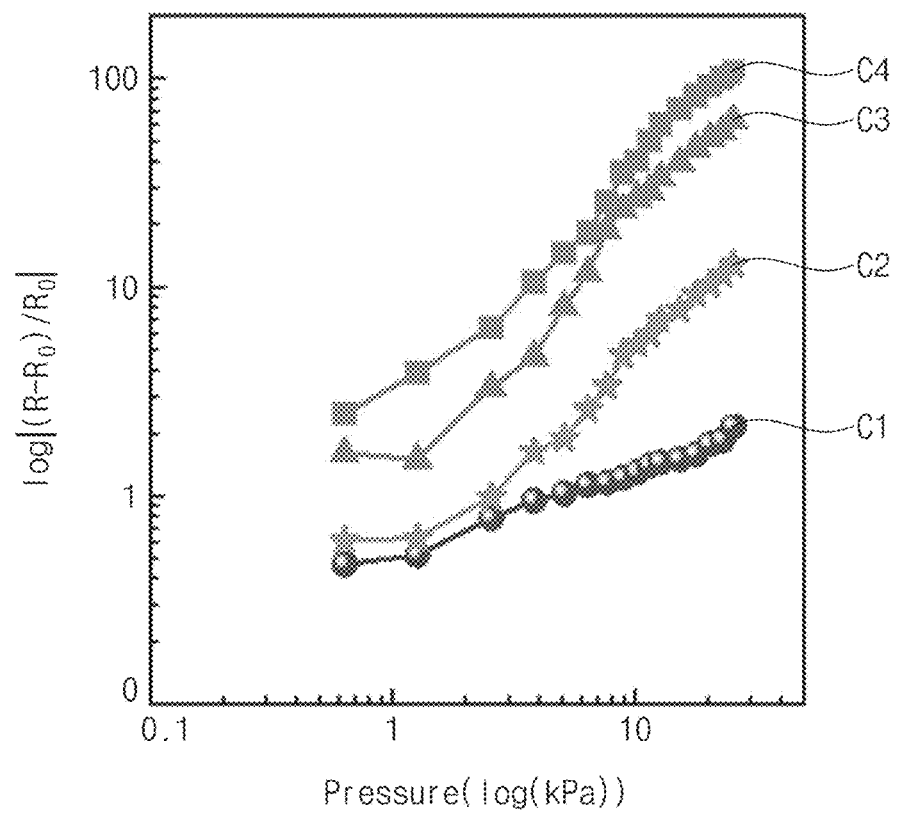
Figure 10C:
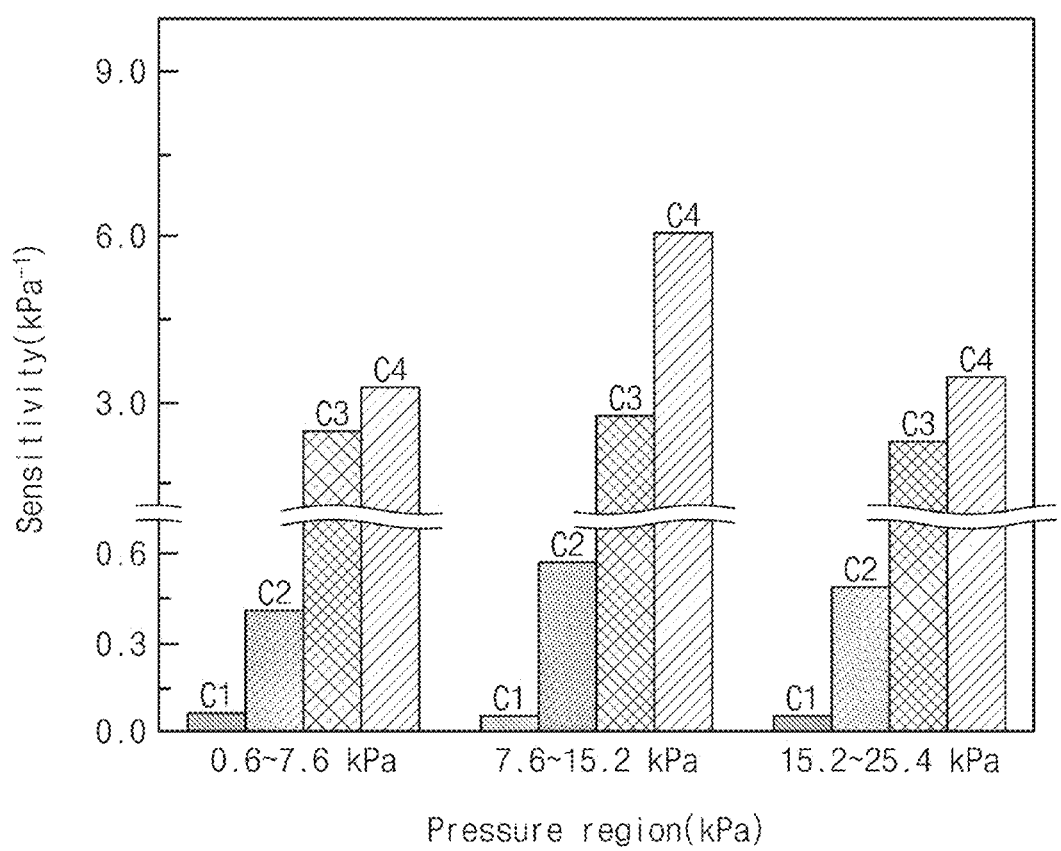
Figure 10D:
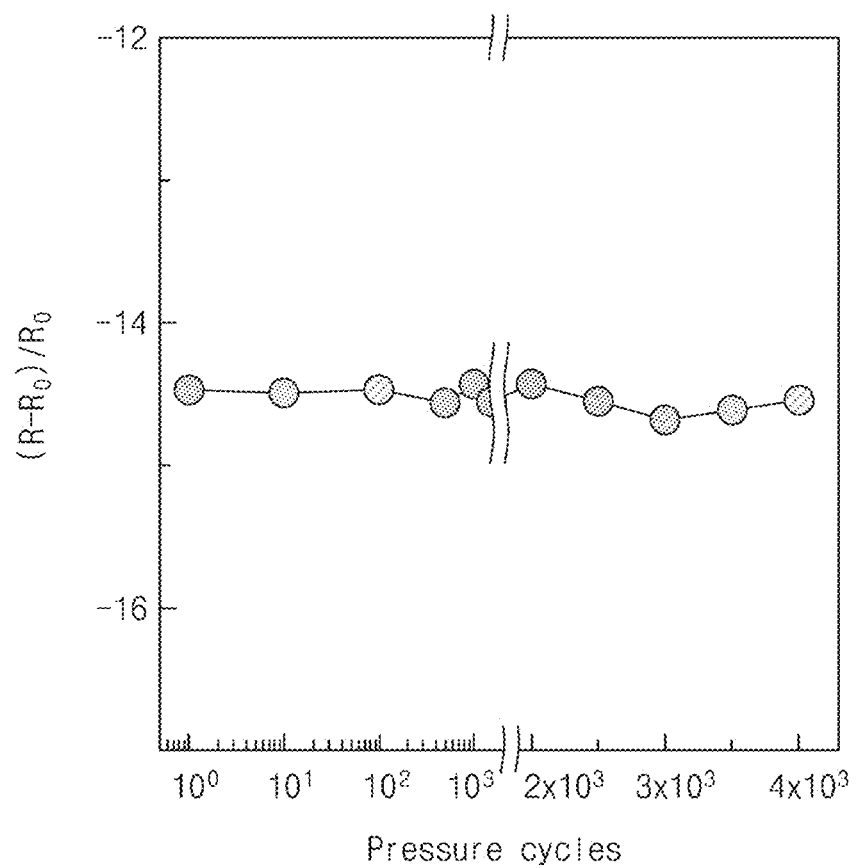

FIGS. 10A and 10D are views for describing a resistance according to a pressure applied to a pressure-strain sensor according to embodiments of the inventive concept.

In FIGS. 10A to 10D, the first pressure-strain sensor C1 is provided such that a composite structure is configured from a graphene structure and ECOFLEX, the second pressure-strain senor C2 is provided such that a composite structure is configured from a graphene structure, ECOFLEX, and planar sheets obtained by immersing a first pre-structure immersed in the solution of about 0.2 wt % $(NH_4)_2MoS_4$ for 30 minutes, and then drying and thermally treating the immersed pre-structure at about 600° C., the third pressure-strain sensor C3 is provided such that a composite structure is configured from a graphene structure, ECOFLEX, and planar sheets obtained by immersing a first pre-structure immersed in about 0.5 wt % solution of $(NH_4)_2MoS_4$ for 30 minutes, and then drying and thermally treating the immersed pre-structure at about 600° C., the forth pressure-strain sensor C4 is provided such that a composite structure is configured from a graphene structure, ECOFLEX, and planar sheets obtained by immersing a first pre-structure immersed in about 1.25 wt % solution of $(NH_4)_2MoS_4$ for 30 minutes, and then drying and thermally treating the immersed pre-structure at about 600° C. $R_0$ is a resistance of the pressure-strain sensor without a pressure applied, and R is a resistance of the pressure-strain sensor with a pressure applied.

In relation to FIGS. 10A and 10B, it may be checked that under the same pressure, the second pressure-strain sensor C2 has a larger value of $(R-R_0)/R_0$ than the first pressure-strain sensor C1, the third pressure-strain sensor C3 has a larger value of $(R-R_0)/R_0$ than the second pressure-strain sensor C2, and the fourth pressure-strain sensor C4 has a larger value of $(R-R_0)/R_0$ than the third pressure-strain sensor C3. As the applied pressure is larger, the difference between values of $(R-R_0)/R_0$ of the first to fourth pressure-strain sensors is large.

In relation to FIG. 10C, in a pressure range of 0.6 kPa to 7.6 kPa, a pressure range of 7.6 kPa to 15.2 kPa, and a pressure range of 15.2 kPa to 25.4 kPa, the sensitivities of the first to fourth pressure-strain sensors C1, C2, C3, and C4 may be checked. Here, the sensitivity may be a value obtained by dividing a change amount of a value of $(R-R_0)/R_0$ by a pressure change amount in the corresponding pressure range. In all the pressure ranges, it may be checked that the sensitivity of the second pressure-strain sensor C2 is larger than that of the first pressure-strain sensor C1, the sensitivity of the third pressure-strain sensor C3 is larger than that of the second pressure-strain sensor C2, and the sensitivity of the fourth pressure-strain sensor C4 is larger than that of the third pressure-strain sensor C3.

In the pressure range of about 7.6 kPa to about 15.2 kPa, the sensitivity of the fourth pressure-strain sensor C4 was measured as 6.06 $kPa^{-1}$. In other words, (the absolute value of the difference between the $(R-R_0)/R_0$ value of the fourth pressure-strain sensor C4 at 15.2 kPa and the $(R-R_0)/R_0$ value of the fourth pressure-stain sensor C4 at 7.6 kPa)/(15.2 kPa–7.6 kPa) was measured as 6.06 $kPa^{-1}$.

In relation to FIG. 10D, the $(R-R_0)/R_0$ value may be checked according to the pressure cycle of application of the pressure of 5.08 kPa to the fourth pressure-strain sensor C4. It may be checked that a change in $(R-R_0)/R_0$ value is not large until the pressure cycle of the application of the pressure reaches to 4,000 times. In this way, it may be checked that the pressure-strain sensor according to the embodiment of the inventive concept has excellent durability.

Figure 11A:
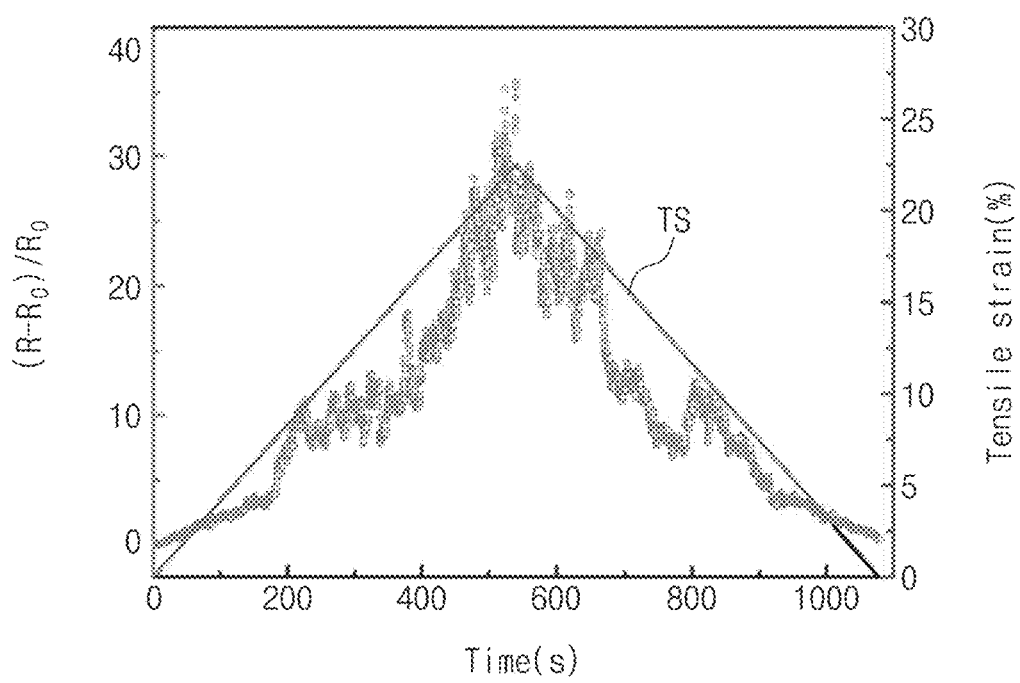
FIG. 11A is a view for explaining a resistance according to a tensile strain of a pressure-strain sensor according to an embodiment of the inventive concept.

FIG. 11A is a view for explaining a resistance according to a tensile strain of the pressure-strain sensor according to embodiments of the inventive concept.

In relation to FIG. 11A, a change in $(R-R_0)/R_0$ value may be checked when a tensile stress is applied to the fourth pressure-strain sensor to change the tensile strain TS from 0% to 23%, and then change again to 0%. It may be checked that as the tensile strain TS of the fourth pressure-strain sensor increases, the $(R-R_0)/R_0$ value increases, and as the tensile strain TS of the fourth pressure-strain sensor decreases, the $(R-R_0)/R_0$ value decreases. It may be checked that $(R-R_0)/R_0$ value increases and decreases symmetrically.

Figure 11B:
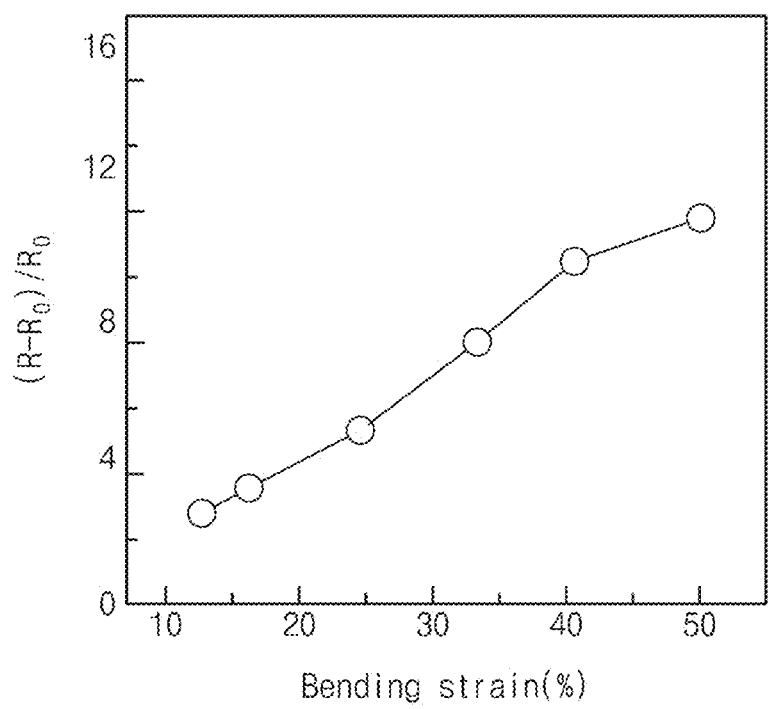
FIG. 11B is a view for describing a resistance according to a bending strain of a pressure-strain sensor according to embodiments of the inventive concept.

FIG. 11B is a view for describing a resistance according to a bending strain of the pressure-strain sensor according to embodiments of the inventive concept.

In relation to FIG. 11B, a change in $(R-R_0)/R_0$ value may be checked when a bending stress is applied to the fourth pressure-strain sensor to change the bending strain from 0% to 50%. It may be checked that the $(R-R_0)/R_0$ value increases according to an increase of the bending strain of the fourth pressure-strain sensor. The bending stain and the $(R-R_0)/R_0$ value of the fourth pressure-strain sensor is as the following Table 1.

TABLE 1

| Bending strain (%) | $(R - R_0)/R_0$ |
| --- | --- |
| 12.6 | 2.79 |
| 16.2 | 3.55 |
| 24.5 | 5.3 |
| 33.3 | 8 |
| 40.6 | 10.47 |
| 50 | 11.85 |

According to embodiments of the inventive concept, the pressure-strain sensor may include the graphene structure, the planar sheets, and the polymer layer to provide excellent sensitivity and durability.

Although the exemplary embodiments of the present invention have been described, it is understood that the present invention may be implemented as other concrete forms without changing the inventive concept or essential features. Therefore, these embodiments as described above are only proposed for illustrative purposes and do not limit the present disclosure.

What is claimed is:

1. A pressure-strain sensor, comprising:
 a graphene structure having a three-dimensional porous structure;
 a plurality of planar sheets provided on a surface of the graphene structure;
 a polymer layer configured to cover the graphene structure and the plurality of planar sheets,
 wherein each planar sheet of the plurality of planar sheets contains a transition metal chalcogenide compound.

2. The pressure-strain sensor of claim 1, wherein each planar sheet of the plurality of planar sheets contains at least one material selected from the group consisting of $MoS_2$, $WS_2$, $TiS_2$, $TaS_2$, $NiS_2$, $PtS_2$, $PdS_2$, $ReS_2$, $ZrS_2$, $HfS_2$, $NbS_2$, $CoS_2$, $MoSe_2$, $WSe_2$, $TiSe_2$, $TaSe_2$, $NiSe_2$, $PtSe_2$, $PdSe_2$, $ReSe_2$, $ZrSe_2$, $HfSe_2$, $NbSe_2$, $CoSe_2$, $MoTe_2$, $WTe_2$, $TiTe_2$, $TaTe_2$, $NiTe_2$, $PtTe_2$, $PdTe_2$, $ReTe_2$, $ZrTe_2$, $HfTe_2$, $NbTe_2$, $CoTe_2$, and a combination thereof.

3. The pressure-strain sensor of claim 1, wherein the graphene structure has an interior that is an empty space.

4. The pressure-strain sensor of claim 1, further comprising a protection layer configured to surround the graphene structure, the plurality of planar sheets, and the polymer layer.

5. The pressure-strain sensor of claim 4, further comprising a wire configured to penetrate through the protection layer and to connect to the plurality of planar sheets.

6. The pressure-strain sensor of claim 1, wherein each planar sheet of the plurality of planar sheets is separated from other planar sheets of the plurality of planar sheets.

7. The pressure-strain sensor of claim 6, wherein the plurality of planar sheets cover a part of the surface of the graphene structure, and expose another part of the graphene structure.

8. The pressure-strain sensor of claim 4, wherein the polymer layer and the protection layer contain an identical material.

9. The pressure-strain sensor of claim 8, wherein each of the polymer layer and the protection layer contain one material selected from the group consisting of Polydimethylsiloxane (PDMS), ECOFLEX, hydrogel, and a flexible polymer.

* * * * *